United States Patent
Johnson et al.

(10) Patent No.: US 9,790,050 B2
(45) Date of Patent: Oct. 17, 2017

(54) AUTO-ADJUSTABLE WIRE PRECAST SYSTEM

(71) Applicant: Bartell Machinery Systems L.L.C., Rome, NY (US)

(72) Inventors: Christopher L. Johnson, Blossvale, NY (US); Joseph Michael Henderson, Camden, NY (US)

(73) Assignee: BARTELL MACHINERY SYSTEMS, L.L.C., Rome, NY (US)

(*) Notice: Subject to any disclaimer, the term of this patent is extended or adjusted under 35 U.S.C. 154(b) by 653 days.

(21) Appl. No.: 14/186,899

(22) Filed: Feb. 21, 2014

(65) Prior Publication Data

US 2014/0239115 A1 Aug. 28, 2014

Related U.S. Application Data

(60) Provisional application No. 61/770,034, filed on Feb. 27, 2013.

(51) Int. Cl.
| | |
|---|---|
| *B65H 57/14* | (2006.01) |
| *B65H 51/20* | (2006.01) |
| *B65H 51/22* | (2006.01) |
| *B65H 51/26* | (2006.01) |
| *B65H 51/04* | (2006.01) |
| *B65H 51/06* | (2006.01) |

(Continued)

(52) U.S. Cl.
CPC ............ *B65H 57/14* (2013.01); *B29D 30/48* (2013.01); *B29D 2030/487* (2013.01);
(Continued)

(58) Field of Classification Search
CPC . B21C 19/00; B21C 49/00; B21F 1/02; B21F 9/00; B21F 9/002; B29D 30/48;
(Continued)

(56) References Cited

U.S. PATENT DOCUMENTS

| 2,185,245 | A | * | 1/1940 | Cotchett | .................. | D04D 1/00 |
| | | | | | | 242/485.3 |
| 2,226,135 | A | * | 12/1940 | Newton, Jr. | ......... | B65H 63/086 |
| | | | | | | 242/485.3 |

(Continued)

FOREIGN PATENT DOCUMENTS

| WO | WO 97/48548 | 12/1997 |
| WO | WO 01/60540 | 8/2001 |

OTHER PUBLICATIONS

Examination Report for EP14156534.1 dated Mar. 2, 2016, 4 pgs.
(Continued)

*Primary Examiner* — Teresa M Ekiert
*Assistant Examiner* — Gregory Swiatocha
(74) *Attorney, Agent, or Firm* — Brinks Gilson & Lione (57) ABSTRACT

A system for adjusting a path of a wire includes a precast pulley assembly having at least one precast pulley having at least first and second positions. The at least one precast pulley may be adjustable from the first position to the second position without a user touching the at least one precast pulley. A path of a wire is adjusted when disposed around the at least one precast pulley when it is in the second position instead of in the first position. In one embodiment, the precast pulley assembly includes first and second precast pulleys disposed in an adjacent relationship with respect to one another, wherein a wire can selectively pass over one or both of the first and second precast pulleys.

14 Claims, 7 Drawing Sheets

(51) Int. Cl.
*B65H 51/08* (2006.01)
*B29D 30/40* (2006.01)
*B29D 30/48* (2006.01)

(52) U.S. Cl.
CPC .............. *B65H 51/04* (2013.01); *B65H 51/06* (2013.01); *B65H 51/08* (2013.01); *B65H 51/20* (2013.01); *B65H 51/22* (2013.01); *B65H 51/26* (2013.01)

(58) Field of Classification Search
CPC .. B29D 2030/487; B65H 57/14; B65H 51/20; B65H 51/22; B65H 51/26; B65H 51/02; B65H 51/04; B65H 51/06; B65H 51/08
USPC ....... 242/615.2, 417.2, 417.3, 364.11, 485.3; 226/118.1, 118.2, 118.3, 110, 179, 180, 226/190, 191, 192; 57/269, 278, 287, 57/310
See application file for complete search history.

(56) References Cited

U.S. PATENT DOCUMENTS

| | | | | |
|---|---|---|---|---|
| 2,237,371 A * | 4/1941 | Simons | ..................... | B21C 1/08 72/289 |
| 2,263,278 A * | 11/1941 | Senna | ..................... | B65H 63/02 242/417.3 |
| 3,049,308 A * | 8/1962 | Lang | ..................... | B29D 30/48 226/118.2 |
| 3,051,362 A | 8/1962 | Shook | | |
| 3,286,499 A | 11/1966 | Junta et al. | | |
| 3,567,148 A * | 3/1971 | Ottavan | ............... | B65H 23/063 242/417.3 |
| 3,912,191 A * | 10/1975 | Anderson | ............ | B65H 23/063 242/156.2 |
| 4,949,567 A | 8/1990 | Corbin | | |
| 5,228,942 A | 7/1993 | Kokui et al. | | |
| 2003/0167748 A1* | 9/2003 | Wortmann | ............. | B65H 51/08 57/284 |
| 2005/0145320 A1* | 7/2005 | Niwa | ..................... | B29D 30/48 156/136 |

OTHER PUBLICATIONS

Request for Examination and Response to Search Opinion filed Feb. 20, 2015, 7 pgs.
Extended European Search Report for Application No. 14156534.1 dated Apr. 28, 2014, 7 pgs.
First Office Action for Chinese patent application 201410067992.X dated Feb. 28, 2017, 12 pgs. Including English translation.

* cited by examiner

AUTO-ADJUSTABLE WIRE PRECAST SYSTEM

PRIORITY CLAIM

This invention claims the benefit of priority of U.S. Provisional Application Ser. No. 61/770,034, entitled "Auto-Adjustable Wire Precast System," filed Feb. 27, 2013, the disclosure of which is hereby incorporated by reference in its entirety.

BACKGROUND

The present embodiments relate generally to systems and methods for automating adjustments of a travel path of a wire, such as one used to form tire beads.

Many types of vehicular tires include beads surrounding the openings that engage the wheel rim. In general, beads comprise a wire coil in the nature of a hoop formed by winding multiple turns of a coated wire on a suitable bead forming apparatus. The bead may be made up of multiple, radially and axially arranged turns of a single wire or, in so-called weftless beads, of radially stacked layers of a flat ribbon including a plurality of side-by-side wires.

In any case, the single or multiple wires are pulled from one or more supply reels and passed through an extrusion die apparatus that applies a coating of rubber or rubberized material to the wire(s). The coated wire or ribbon is supplied to a conventional bead forming apparatus wherein one or more beads are wound to the desired dimensions and cross-sectional configuration.

In some machines, multiple sheaves or pulleys are provided between the coating operation and the bead forming apparatus to guide the wire and maintain tension upon the wire as conditions change. In general, the sheaves or pulleys are mounted upon respective axles for independent rotation. The multiple sheaves are mounted upon suitable support means, usually in vertically disposed relation, for relative movement toward and away from one another as the bead material is dispensed faster and slower, respectively, than it is accumulated. Most commonly, an upper set of sheaves is fixedly supported at a position several meters above floor level and a lower set is vertically movable with respect thereto in order to ensure that proper tension is maintained during such movement.

In some systems, a precast pulley of a predetermined size is provided between the coating process and the bead winding process. Such precast pulleys are usually available in three different sizes, where one size is selected at a time. The selected precast pulley may comprise a plurality of grooves to provide a predetermined wire path to pre-form the wire to the required tire bead diameter during the winding process. In conventional systems, if it is desired to change the finished bead size, then operation of the machine must be stopped and a user must manually open the machine and reposition the wire in a different groove of the precast pulley, or change out the precast pulley for another precast pulley of a different size. In any case, it is a time-consuming process with safety risks due to the user intervention into the machine.

SUMMARY

A system for adjusting a path of a wire comprises a precast pulley assembly comprising at least one precast pulley having at least first and second positions. The at least one precast pulley is adjustable from the first position to the second position without a user touching the at least one precast pulley. A path of a wire is adjusted when disposed around the at least one precast pulley when it is in the second position instead of in the first position.

In one embodiment, the precast pulley assembly comprises first and second precast pulleys disposed in an adjacent relationship with respect to one another, wherein a wire can selectively pass over one or both of the first and second precast pulleys. The first precast pulley may comprise first and second ends, a generally tapered shape between the first and second ends, and a plurality of grooves disposed circumferentially around the first precast pulley at locations between the first and second ends. Similarly, the second precast pulley may comprise first and second ends, a generally tapered shape between the first and second ends, and a plurality of grooves disposed circumferentially around the second precast pulley at locations between the first and second ends.

The first precast pulley may be smaller than the second precast pulley. In one embodiment, a diameter of a largest groove of the first precast pulley is smaller than a diameter of a smallest groove of the second precast pulley.

A support assembly may be configured to hold the first and second precast pulleys in a predetermined angular orientation and to enable circumferential rotation of the first and second precast pulleys. The support assembly may comprise a driven member coupled to a frame, where the frame extends in a lateral direction with respect to the driven member. The frame may comprise a first region to which the first precast pulley is coupled, a second region to which the second precast pulley is coupled, and a central region disposed between the first and second regions to which the driven member is coupled. The first region may comprise a bore formed therein, and a shaft of the first precast pulley may be disposed through the bore and adapted for selective longitudinal advancement relative to the bore of the frame.

The system may also comprise a first sheave having a groove and a second sheave having a groove, wherein the wire is disposed around the first sheave, then around the at least one precast pulley, and then around the second sheave. In one embodiment, a front surface of the first sheave is generally flat and a rear surface of the second sheave is generally flat, such that the front surface of the first sheave abuts the rear surface of the second sheave. The system may also comprise a take-up sheave and an outlet sheave, wherein the wire, after being disposed around the second sheave, is disposed around the take-up sheave and then around the outlet sheave.

Other systems, methods, features and advantages of the invention will be, or will become, apparent to one with skill in the art upon examination of the following figures and detailed description. It is intended that all such additional systems, methods, features and advantages be within the scope of the invention, and be encompassed by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
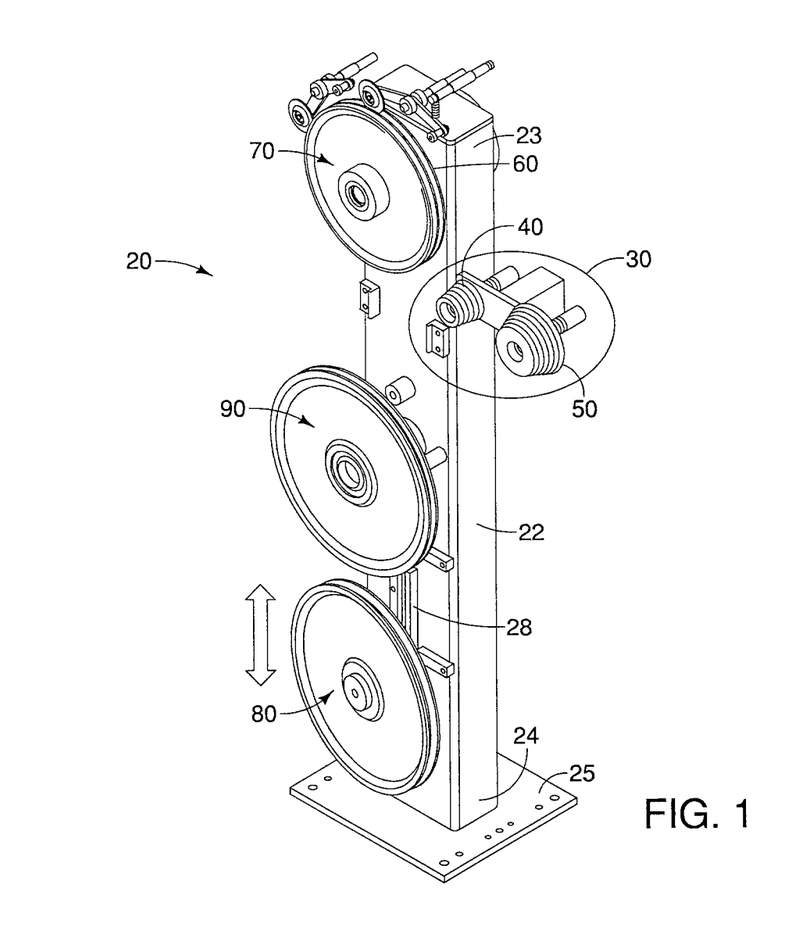
FIG. 1 is a schematic perspective view of an embodiment of a system for adjusting a path of a wire.

Referring to FIG. 1, a schematic perspective view of an embodiment of a system 20 for adjusting a path of a wire is shown and described. In this embodiment, the system 20 comprises a support column 22 having upper and lower ends 23 and 24, respectively, and a base 25 at the lower end 24. The system 20 further comprises a precast pulley assembly 30 having first and second precast pulleys 40 and 50, which are described in further detail in FIGS. 4-5 below. Additionally, the system 20 comprises a first sheave 60 and a second sheave 70, which are described further in FIGS. 2-3 below, and further comprises a take-up sheave 80 and an outlet sheave 90.

Figure 6:
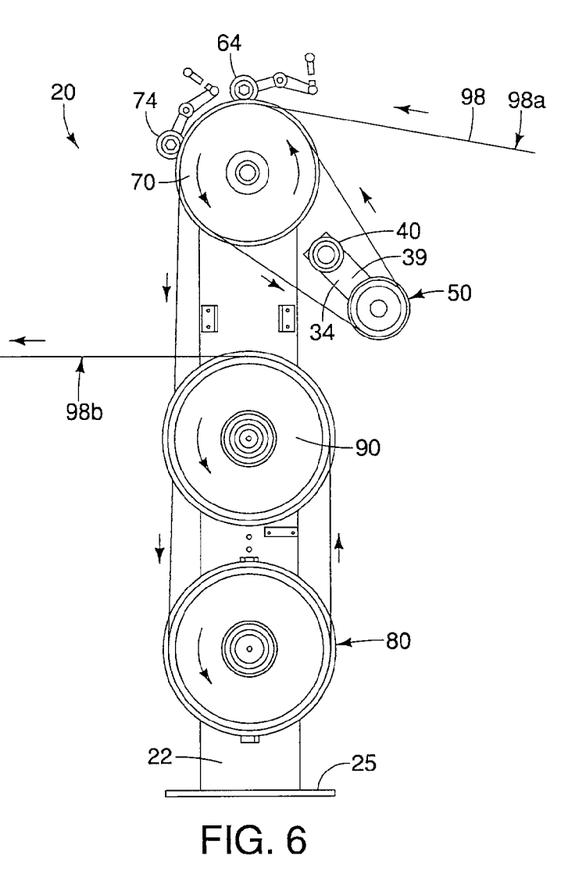
FIGS. 6-13 are front views illustrating an exemplary sequence of use of the system of FIGS. 1-5.

As will be described and shown further in the exemplary sequence of FIGS. 6-13 below, a wire 98 is fed through the system 20. The wire 98 arrives from an extruder at an initial location 98a, as depicted in FIG. 6, from which the extruder has applied a desired coating to the wire 98 as is generally known. The wire 98 is guided from the initial location 98a in a direction around the first sheave 60, then around the precast pulley assembly 30, around the second sheave 70, around the take-up sheave 80, and around the outlet sheave 90, as generally depicted by the small arrows shown in FIG. 6. After being guided around the outlet sheave 90, the wire 98 extends past a subsequent location 98b to a winding assembly, wherein the wire is wound to a bead having desired dimensions.

Figure 2:
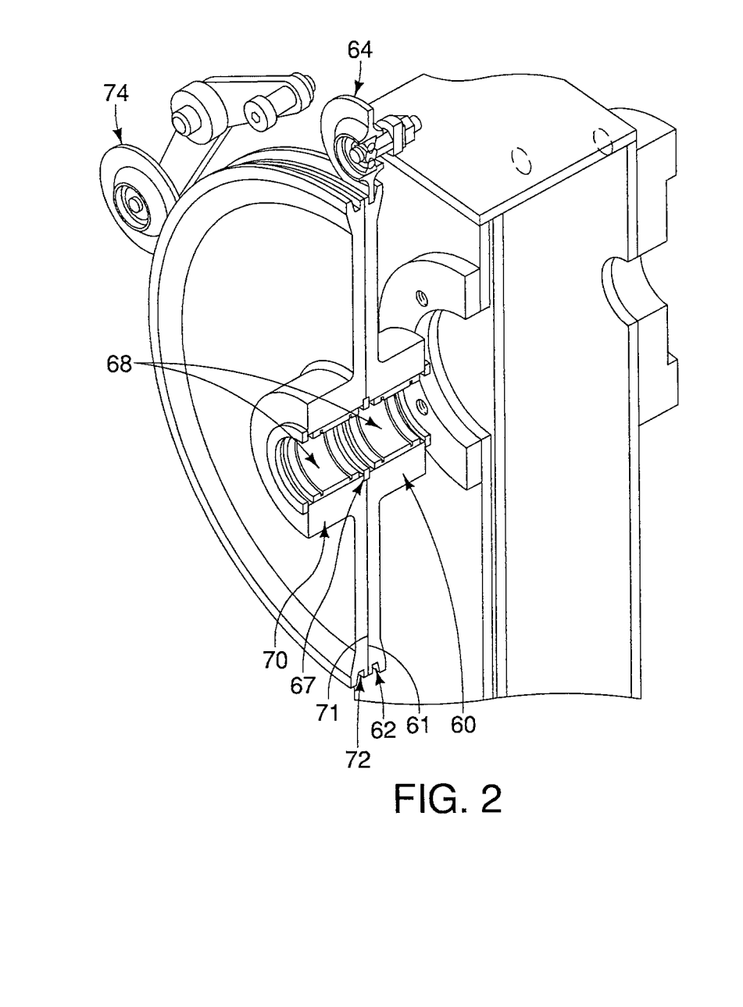
FIG. 2 is a cut-away view illustrating features of first and second sheaves of the system of FIG. 1.
Figure 3:
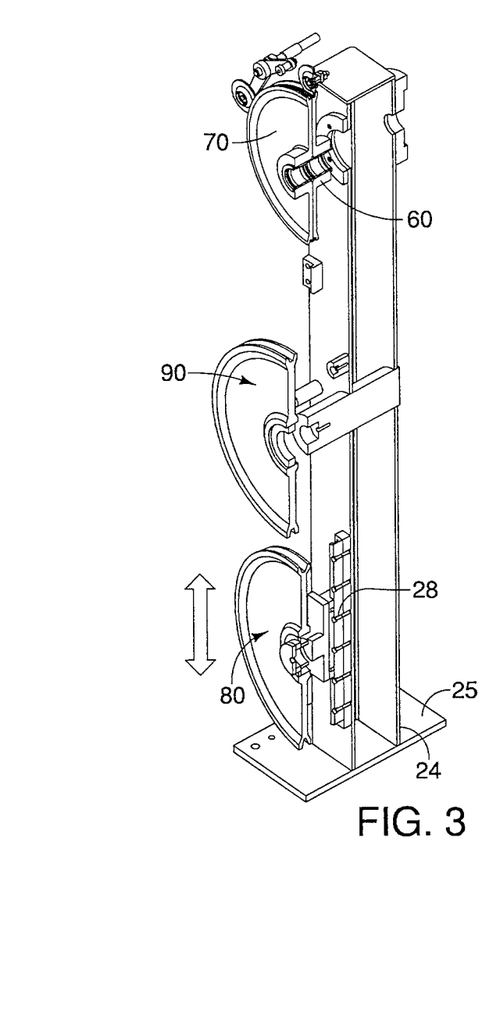
FIG. 3 is a cut-away view illustrating further features of the system of FIG. 1.

Referring to FIGS. 2-3, further details of the first and second sheaves 60 and 70 are shown. The first and second sheaves 60 and 70 are each mounted for rotational movement about an axle near the upper end 23 of the support column 22. A front surface 61 of the first sheave 60 is generally flat, and a rear surface 71 of the second sheave 70 is also generally flat, such that the front surface 61 of the first sheave 60 abuts the rear surface 71 of the second sheave 70, as shown in FIG. 2. A thrust bearing 67 is positioned in a circumferential slot between the first and second sheaves 60 and 70, as depicted in FIG. 2. Further, a one-way bearing 68 may be used to maintain the positioning of the first and second sheaves 60 and 70 relative to one another in the orientation generally shown in FIG. 2. The one-way bearing arrangement will allow wire pulled into the system and pulled out of the system, but will isolate the pre-casting pulleys from slack wire, thus maintaining the proper wrap angle around the given precast step.

Advantageously, by providing first and second sheaves 60 and 70 in an abutting relationship as shown in FIG. 2, the sheaves 60 and 70 may rotate separately or together with respect to one another, an option which cannot be achieved by conventional systems that to employ a single pulley having first and second grooves.

The first and second sheaves 60 and 70 comprise grooves 62 and 72, respectively. A wire keeper 64 may be positioned adjacent to the first sheave 60 in a manner that ensures the wire 98 of FIGS. 6-13 remains within the groove 62 of the first sheave 60, while a wire keeper 74 may be positioned adjacent to the second sheave 70 in a manner that ensures the wire 98 remains within the groove 72 of the second sheave 70. As depicted in FIG. 2, the wire keepers 64 and 74 may comprise rollers that are biased towards their respective grooves 62 and 72.

Referring to FIG. 3, a cut-away view of the support column 22 and other components is shown. The take-up sheave 80 is adjustable vertically with respect to the support column 22 in order to regulate tension for the wire 98 as it travels along the system 20. In one embodiment, the take-up sheave 80 may travel along a linear rail 28 disposed on the support column 22, and the take-up sheave 80 further is coupled to a pneumatic cylinder that will bias the take-up sheave 80 in a downward direction. In this manner, tension of the wire 98 may be regulated as the wire 98 travels along the system, regardless of the positioning of the of the precast pulley assembly 30 in any orientation, as described further below.

Figures 4, 5:
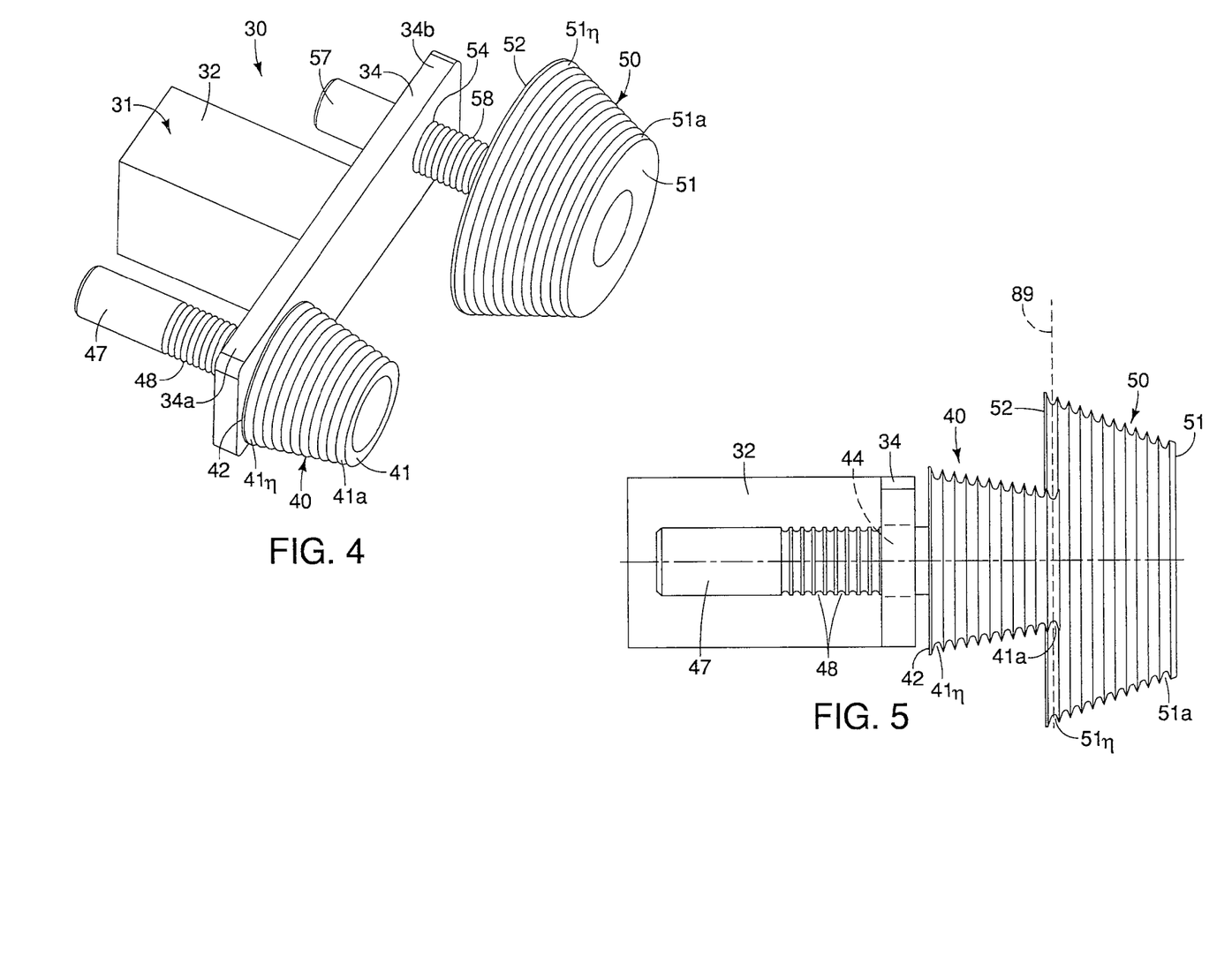
FIG. 4 is a schematic perspective view of a first embodiment of a precast pulley assembly having first and second precast pulleys.
FIG. 5 is a side view of the precast pulley assembly of FIG. 4.

Referring now to FIGS. 4-5, further features of one embodiment of the precast pulley assembly 30, including the first and second precast pulleys 40 and 50, are shown and described. The first precast pulley 40 comprises first and second ends 41 and 42, and comprises a generally tapered shape between the first and second ends 41 and 42. A plurality of grooves 41a through 41n are disposed circumferentially around the first precast pulley 40 at locations between the first and second ends 41 and 42. The groove 41a is disposed near the first end 41 and comprises the smallest diameter, while the groove 41n is disposed near the second end 42 and comprises the largest diameter, as shown in FIGS. 4-5.

Similarly, the second precast pulley 50 comprises first and second ends 51 and 52, and comprises a generally tapered shape between the first and second ends 51 and 52. A plurality of grooves 51a through 51n are disposed circumferentially around the second precast pulley 50 at locations between the first and second ends 51 and 52, where the groove 51a is disposed near the first end 51 and comprises the smallest diameter, while the groove 51n is disposed near the second end 52 and comprises the largest diameter. It should be noted that "n" for parts 41n and 51n corresponds to the total number of grooves, and any number of grooves may be provided, i.e., greater or fewer than the eleven grooves depicted in FIGS. 4-5.

Figure 10:
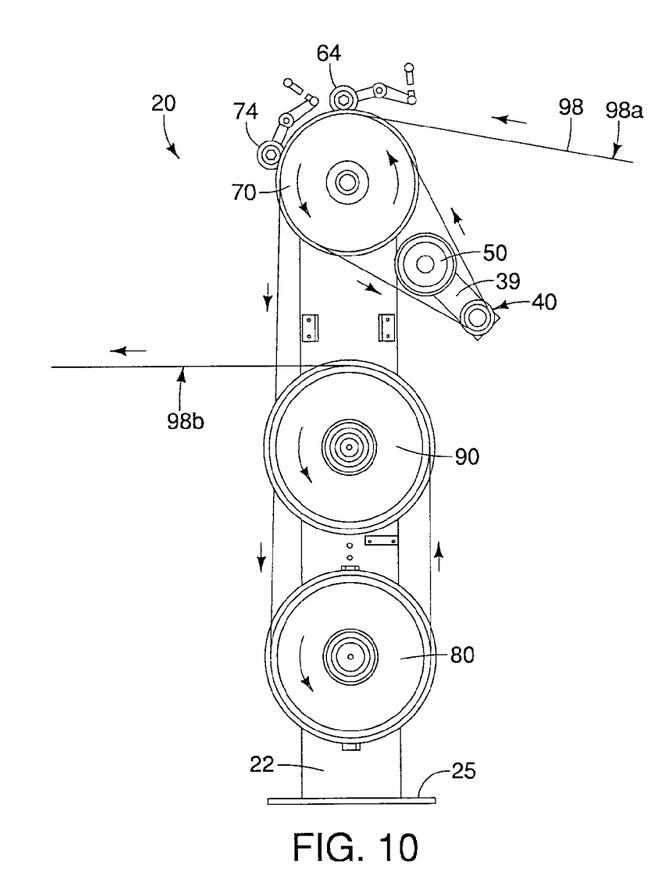
Figure 11:
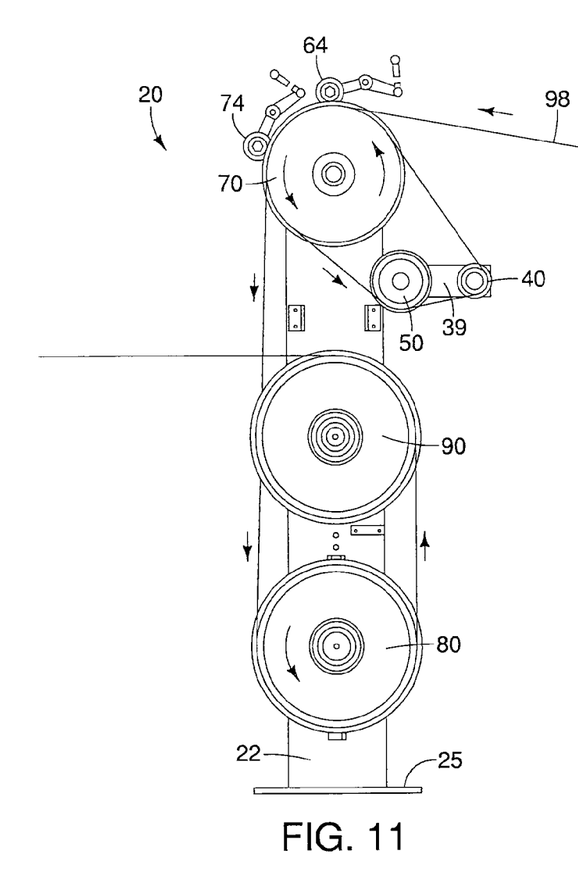
Figure 12:
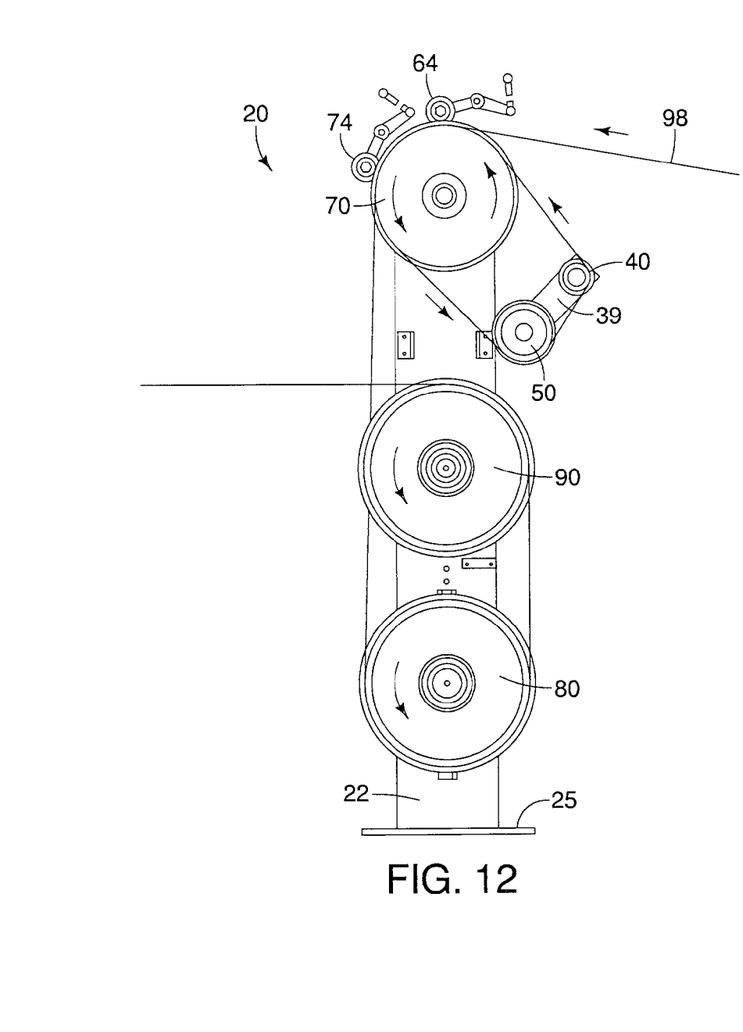
Figure 13:
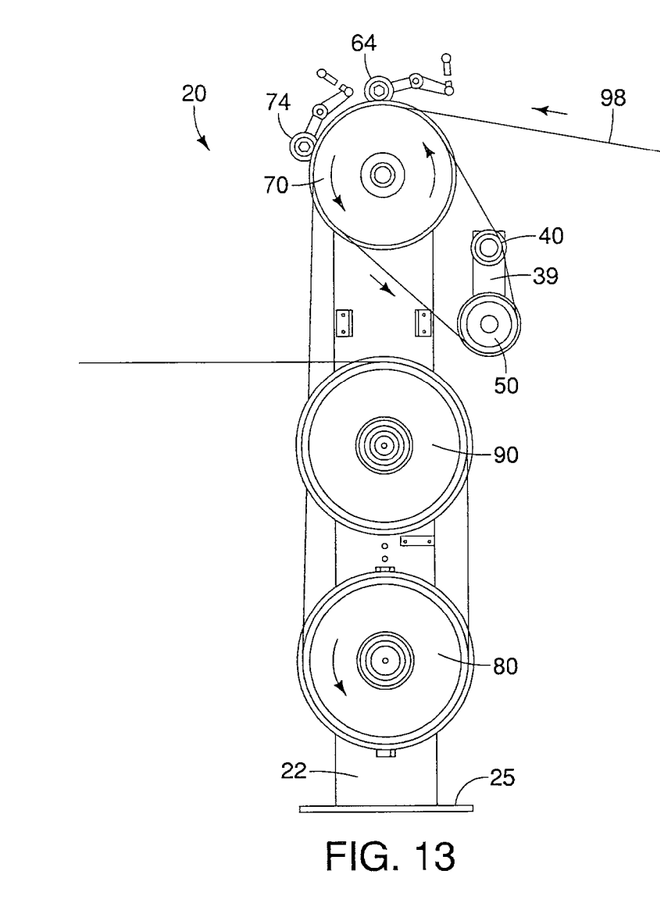

In one embodiment, the diameter of the largest groove 41n of the first precast pulley 40 is less than the diameter of the smallest groove 51a of the second precast pulley 50, as depicted in FIG. 5. Advantageously, an extremely large range of wire travel increments may be provided around the first precast pulley 40 and/or the second precast pulley 50. For example, a relatively small travel pathway may occur when the wire is positioned around only one of the grooves 41a-41n of the first precast pulley 40, as shown in FIG. 10 below. A relatively intermediate travel pathway may occur when the wire is positioned around only one of the grooves 51a-51n of the second precast pulley 50, as shown in FIG. 6 below. A relatively long travel pathway may occur when the wire 98 is positioned to travel simultaneously around one of the grooves 41a-41n of the first precast pulley 40 and one of the grooves 51a-51n of the second precast pulley 50, as depicted in FIGS. 7-9 and 11-13 below.

A support assembly 31, as best seen in FIG. 4, is provided to hold the first and second precast pulleys 40 and 50 in a desired orientation and to facilitate rotation of the first and second precast pulleys 40 and 50, as described more fully with respect to FIGS. 6-13 below. In one exemplary, non-limiting embodiment, the support assembly 31 comprises a driven member 32 coupled to a frame 34. The frame 34 may extend in a lateral direction with respect to the driven member 32. In one embodiment, the frame comprises a first region 34*a* to which the first precast pulley 40 is coupled, a second region 34*b* to which the second precast pulley 50 is coupled, and a central region disposed therebetween to which the driven member 32 is coupled, as best seen in FIG. 4. As will be explained further with respect to FIGS. 6-13 below, an actuator, such as a motor, is coupled to the driven member 32 to selectively cause rotation of the driven member 32, and therefore cause a corresponding associated rotation of the frame 34 and the first and second precast pulleys 40 and 50 around a rotational centerline 39, which is depicted in FIGS. 6-13 below.

In one embodiment, the first region 34*a* comprises a bore 44 formed therein, and a shaft 47 of the first precast pulley 40 is disposed through the bore 44, as depicted in FIGS. 4-5. The shaft 47 may be selectively advanced in a longitudinal direction relative to the bore 44 of the frame 34. The shaft 47 may comprise a plurality of detents 48 that selectively engage the frame 34 around the bore 44 to limit longitudinal movement of the first precast pulley 40 with respect to the frame 34.

In one example, a spring-loaded pin may be provided and temporarily withdrawn to permit a clear path for longitudinal advancement of the first precast pulley 40 with respect to the bore 44 and the frame 34. When the spring-loaded pin returns to its biased, relaxed state, it will engage the shaft 47 to prevent longitudinal movement of the first precast pulley 40 with respect to the frame 34.

Similarly, the second region 34*b* of the frame 34 comprises a bore 54 formed therein, and a shaft 57 of the second precast pulley 50 is disposed through the bore 54, as depicted in FIGS. 4-5. The shaft 57 may comprise a plurality of detents 58 and may be selectively advanced in a longitudinal direction relative to the bore 54 of the frame 34, thereby permitting selective longitudinal movement of the second precast pulley 50 with respect to the frame 34 in a manner identical to that described for the first precast pulley 40. In this manner, both the first and second precast pulleys 40 and 50 may be selectively advanced longitudinally with respect to the frame 34, and with respect to one another.

Advantageously, using this technique, a significantly large number of combinations of grooves of the first and second precast pulleys 40 and 50 may aligned with one another along a wire travel path 89. In the example of FIG. 5, the smallest groove 41*a* of the first precast pulley 40 is depicted as being aligned with the largest groove 51*n* of the second precast pulley 50 along the wire travel path 89.

The state of FIG. 5 is only one exemplary travel path for the wire 98. In an alternative embodiment, the wire 98 may be aligned with the smallest groove 41*a* of the first precast pulley 40 and the smallest groove 51*a* of the second precast pulley 50 along the travel path 89, thereby providing a relatively short travel path for the wire 98. Conversely, the wire 98 may be aligned with the largest groove 41*n* of the first precast pulley 40 and the largest groove 51*n* of the second precast pulley 50 along the travel path 89, thereby providing a relatively long travel path for the wire 98. As will be appreciated, by selectively moving the first and second precast pulleys 40 and 50 longitudinally relative to one another, and aligning the desired grooves of one precast pulley with respect to the other, a significant number of different combinations may be achieved to provide the desired travel path 89 for the wire 98.

In any event, regardless of where the wire 98 is chosen to be aligned with the first and second precast pulleys 40 and 50 along the travel path 89 of FIG. 5, additional incremental changes in the orientation/length of wire travel may be subsequently achieved in an automated manner by rotating the frame 34 in predetermined increments, as explained further with respect to FIGS. 6-13 below.

Referring now to FIGS. 6-13, an exemplary sequence of use of the adjustable wire system of FIGS. 1-5 is shown and described. In a first step, a wire 98 arrives from an extruder at an initial location 98*a*, as depicted in FIG. 6. The extruder may have applied a desired coating to the wire 98, as is generally known in the art. The wire 98 is guided from the initial location 98*a* in a direction around the first sheave 60. The wire 98 then is guided around the precast pulley assembly 30, around the second sheave 70, around the take-up sheave 80, and around the outlet sheave 90, as generally depicted by the small arrows shown in FIG. 6. After being guided around the outlet sheave 90, the wire 98 extends past a subsequent location 98*b* to a winding assembly, wherein the wire 98 is wound to a bead having desired dimensions.

In FIG. 6, the precast pulley assembly 30 is shown in a first orientation in which the first precast pulley 40 is generally disposed nearest the first and second sheaves 60 and 70, while the second precast pulley 50 is generally disposed furthest from the first and second sheaves 60 and 70. In this orientation, the wire 98 is disposed around a groove 51*a*-51*n* of the second precast pulley 50, but bypasses the first precast pulley 40 due to the angular positioning of the first precast pulley 40 with respect to the rotational centerline 39.

In the orientation of FIG. 6, the wire 98 travels a predetermined pathway and distance through the system 20, by moving around a desired groove 51*a*-51*n* of a known diameter of only the second precast pulley 50. The desired path of travel of the wire 98 corresponds to a pre-form shape of the wire 98, and a subsequent desired bead diameter formed by the winding process after the pre-formed wire 98 passes location 98*b*. A bead of a specific, corresponding desired diameter will then be manufactured.

In certain situations, it will be desirable to change the diameter of beads that are assembled at the winding assembly downstream of the system 20. This will require a corresponding change in parameters of feeding the wire 98 through the system 20.

Figure 7:
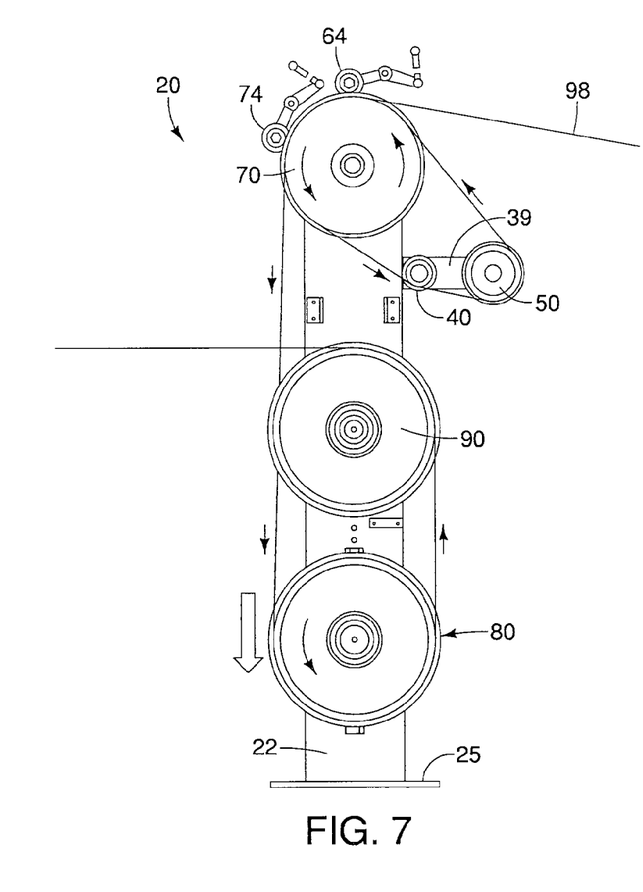
Figures 8, 9:
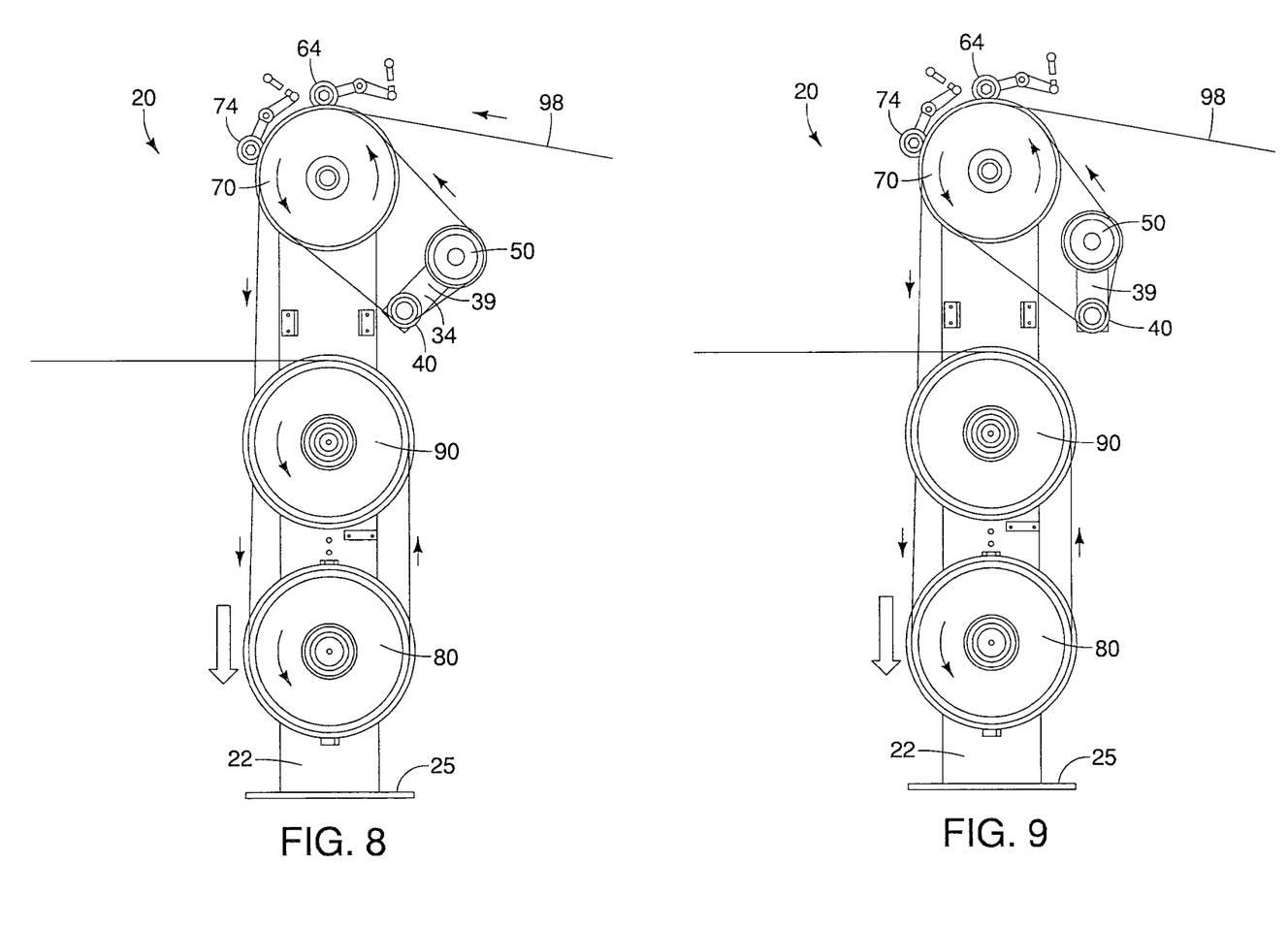

In accordance with one aspect, an automated system, such as a computer program having software instructions, may be provided to determine the proper positioning of the precast pulley assembly 30, and therefore the path of travel of the wire 98 through the system 20, based on a desirable diameter of beads that are assembled at the winding assembly downstream of the system 20. For example, a user may input into a computer a desired diameter of beads to be assembled at the winding assembly, and the computer software can provide instructions to move an actuator coupled to the driven member 32 to selectively cause rotation of the driven member 32, the frame 34, and the first and second precast pulleys 40 and 50 around the rotational centerline 39. Such a change in position can be seen in the counterclockwise rotational movement of the first and second precast pulleys 40 and 50 from the state of FIG. 6 to FIG. 7. In the position of FIG. 7, the wire 98 travels a different path and distance around one of the grooves 41*a*-41*n* of the first precast pulley 40, and further around one of the grooves 51*a*-51*n* of the second precast pulley 50. The take-up sheave 80 is adjustable vertically with respect to the support column 22, as depicted by the vertical arrow in FIG. 7, in order to regulate tension for the wire 98 as it travels along the system 20 in the different pattern.

FIGS. 8-13 show different configurations of the first and second precast pulleys 40 and 50, achieved by incremental rotation of the driven member 32 around the rotational centerline 39. Each positioning increment adjusts the travel of the wire 98 accordingly around the first precast pulley 40 and/or the second precast pulley 50, which in turn corresponds to a different pre-form shape of the wire 98, and a subsequent different bead diameter at the downstream winding assembly.

Advantageously, a user may adjust the travel of the wire 98 through the system 20 in an automated manner, by causing rotation of the first and second precast pulleys 40 and 50, without having to physically open the system and change one precast pulley out for a different precast pulley. This results in a significantly safer system with less manual user intervention.

As a further advantage, a user may enter into a computer a desired final bead diameter to be achieved at the winding assembly, and the first and second precast pulleys 40 and 50 may automatically be adjusted into a position that will provide the necessary precast wire travel path. In this manner, any number of wire bead sizes may be achieved at the winding assembly with a reduction in down time.

Notably, a user may also adjust the movement path of the wire 98 by longitudinally advancing or retracting the shafts 47 and 57 of the first and second precast pulleys 40 and 50, respectively, in the manner described above in FIGS. 4-5, to achieve a significant number of different combinations of desired travel paths for the wire 98. The longitudinal adjustments of the shafts 47 and 57 described in FIGS. 4-5 may be used in combination with the rotational adjustments around the centerline 39 as described in FIGS. 6-13 to provide numerous combinations of travel path for the wire 98.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

We claim:

1. A system for adjusting a path of a wire, the system comprising:
   a precast pulley assembly comprising at least one precast pulley, wherein the at least one precast pulley comprises first and second precast pulleys disposed in an adjacent relationship with respect to one another,
   wherein the wire can selectively pass over one or both of the first and second precast pulleys,
   wherein in a first position the wire engages the second precast pulley and bypasses the first precast pulley, and wherein in a second position the wire engages both the first and second precast pulleys,
   wherein the at least one precast pulley is adjustable from the first position to the second position without a user touching the at least one precast pulley, and
   wherein in a third position the wire engages the first precast pulley and bypasses the second precast pulley.

2. The system of claim 1, wherein the first precast pulley comprises first and second ends, a generally tapered shape between the first and second ends, and a plurality of grooves disposed circumferentially around the first precast pulley at locations between the first and second ends of the first precast pulley.

3. The system of claim 2, wherein the second precast pulley comprises first and second ends, a generally tapered shape between the first and second ends, and a plurality of grooves disposed circumferentially around the second precast pulley at locations between the first and second ends of the second precast pulley.

4. The system of claim 3, wherein a diameter of a largest groove of the first precast pulley is smaller than a diameter of a smallest groove of the second precast pulley.

5. The system of claim 1 further comprising a support assembly configured to hold the first and second precast pulleys in a predetermined angular orientation and to enable circumferential rotation of the first and second precast pulleys.

6. The system of claim 5, wherein the support assembly comprises a driven member coupled to a frame, where the frame extends in a lateral direction with respect to the driven member.

7. The system of claim 6, wherein the frame comprises a first region to which the first precast pulley is coupled, a second region to which the second precast pulley is coupled, and a central region disposed between the first and second regions to which the driven member is coupled.

8. The system of claim 7, wherein the first region of the frame comprises a bore formed therein, and a shaft of the first precast pulley is disposed through the bore and adapted for selective longitudinal advancement relative to the bore of the frame.

9. The system of claim 1 further comprising:
   a first sheave having a groove; and
   a second sheave having a groove,
   wherein the wire is aligned for movement around the first sheave, then around the at least one precast pulley, and then around the second sheave.

10. The system of claim 9, wherein a front surface of the first sheave is generally flat and a rear surface of the second sheave is generally flat, such that the front surface of the first sheave abuts the rear surface of the second sheave.

11. The system of claim 9 further comprising:
    a take-up sheave; and
    an outlet sheave,
    wherein the wire is aligned for movement around the second sheave, then around the take-up sheave, and then around the outlet sheave.

12. A system for adjusting a path of a wire, the system comprising:
    a precast pulley assembly comprising at least one precast pulley, wherein the at least one precast pulley comprises first and second precast pulleys disposed in an adjacent relationship with respect to one another; and
    a support assembly configured to hold the first and second precast pulleys in a predetermined angular orientation and to enable circumferential rotation of the first and second precast pulleys,
    wherein the wire can selectively pass over one or both of the first and second precast pulleys,
    wherein the first precast pulley has a different shape than the second precast pulley, and
    wherein in a first position the wire engages the second precast pulley and bypasses the first precast pulley, and wherein in a second position the wire engages both the first and second precast pulleys.

13. The system of claim 12, further comprising a motor, coupled to the support assembly, that selectively causes rotation of the support assembly and the first and second precast pulleys.

14. A system for adjusting a path of a wire, the system comprising:
- a precast pulley assembly comprising at least one precast pulley, wherein the at least one precast pulley comprises first and second precast pulleys disposed in an adjacent relationship with respect to one another,
- wherein the wire can selectively pass over one or both of the first and second precast pulleys,
- wherein in a first position the wire engages the second precast pulley and bypasses the first precast pulley, and wherein in a second position the wire engages both the first and second precast pulleys, and
- wherein the at least one precast pulley is adjustable from the first position to the second position without a user touching the at least one precast pulley;
- a support assembly configured to hold the first and second precast pulleys in a predetermined angular orientation and to enable circumferential rotation of the first and second precast pulleys,
- wherein the support assembly comprises a driven member coupled to a frame, where the frame extends in a lateral direction with respect to the driven member,
- wherein the frame comprises a first region to which the first precast pulley is coupled, a second region to which the second precast pulley is coupled, and a central region disposed between the first and second regions to which the driven member is coupled, and
- wherein the first region of the frame comprises a bore formed therein, and a shaft of the first precast pulley is disposed through the bore and adapted for selective longitudinal advancement relative to the bore of the frame.

* * * * *